US006601442B1

(12) United States Patent
Decker et al.

(10) Patent No.: US 6,601,442 B1

(45) Date of Patent: Aug. 5, 2003

(54) DUTY CYCLE MONITORING SYSTEM FOR AN ENGINE

(75) Inventors: Scott G. Decker, Columbus, IN (US); Gregory G. Greathouse, Columbus, IN (US); John M. Irons, Greenwood, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 09/400,666

(22) Filed: Sep. 20, 1999

(51) Int. Cl.[7] .......................... G01P 21/00; G06F 19/00

(52) U.S. Cl. ....................................... 73/117.3; 701/114

(58) Field of Search ............................. 73/117.3, 118.1; 701/35, 114, 115; 340/462; 123/468, 480, 488

(56) References Cited

U.S. PATENT DOCUMENTS

| | | | | |
|---|---|---|---|---|
| 4,866,619 A | | 9/1989 | Iwaki | |
| 4,987,544 A | | 1/1991 | Honda et al. | |
| 5,053,968 A | | 10/1991 | Uchinami | |
| 5,056,026 A | | 10/1991 | Mitchell et al. | |
| 5,080,075 A | | 1/1992 | Miwa et al. | |
| 5,268,842 A | * | 12/1993 | Marston et al. | 364/431.05 |
| 5,303,163 A | * | 4/1994 | Ebaugh et al. | 364/550 |
| 5,309,139 A | * | 5/1994 | Austin | 340/462 |
| 5,394,136 A | * | 2/1995 | Lammers et al. | 340/439 |
| 5,606,959 A | | 3/1997 | Maki et al. | |
| 5,638,802 A | | 6/1997 | Maki et al. | |
| 5,754,965 A | * | 5/1998 | Hagenbuch | 701/35 |
| 5,806,012 A | | 9/1998 | Maki et al. | |

* cited by examiner

*Primary Examiner*—Benjamin R. Fuller
*Assistant Examiner*—Maurice Stevens
(74) *Attorney, Agent, or Firm*—Barnes & Thornburg

(57) ABSTRACT

A system and method for monitoring engine performance utilizes a monitoring micro-controller that integrates with an engine/vehicle controller to receive data indicative of the current operating conditions of the engine/vehicle. A duty cycle map is defined within the micro-controller by a plurality of sectors bounded by a specific performance curve based on two or more engine operating parameters, such as engine torque and speed. Each sector corresponds to a range of values for the specific operating parameters. During iterations of the monitoring routine, current data indicative of the specific engine operating parameters is sensed and compared with the range of values for each duty cycle sector. A duty cycle parameter, such as elapsed time or fuel consumption, is maintained for each sector. When the current engine operating conditions fall within a particular target sector, its corresponding duty cycle parameter is updated. This process is continued over several iterations to define a duty cycle map over a predetermined number of engine operating hours. In one embodiment, a long term map is accumulated between engine rebuilds, for example. In another embodiment, the long term duty cycle map is augmented by sequentially accessed short term maps, each storing duty cycle information for much shorter engine hours. The duty cycle maps can be used to evaluate engine maintenance requirements or suggest modifications to engine control routines and fueling strategies.

19 Claims, 5 Drawing Sheets

DUTY CYCLE MONITORING SYSTEM FOR AN ENGINE

BACKGROUND OF THE INVENTION

The present invention generally relates to devices and methods for monitoring the performance of an engine, such as an internal combustion engine. More specifically, the invention provides a system for monitoring data related to the engine performance and defining an engine duty cycle.

Owners and operators of power plants, such as internal combustion engines, are continuously faced with the problem of making the most economical use of their engines. This need is particularly keen for automotive engines and the vehicles that they power. Vehicle and engine recording devices have been developed for a variety of applications pertaining to both operator and vehicle communication and control. From the vehicle operator's standpoint, a recording device can be used to log and report such items as the operator's driving time, trip time, vehicle and engine faults, and other operating information. With respect to the vehicle itself, the recording device can be used to record fuel efficiency on a trip-by-trip basis, engine operating parameters and other related information.

One such system is depicted in FIGS. 1 and 2. In this prior system, a vehicle monitoring device 10 communicates with an engine/vehicle controller 12 via a communications bus 14. The communications bus is typically according to an industry standard configuration, such as an SAE-J1587 bus. This data bus is preferred in the automotive and trucking industry because it permits communication of a large quantity of data between the controller 12 and the monitoring device 10.

In a typical automotive vehicle, the controller 12 not only controls the function of various components of the engine and vehicle, it also generates data or translates sensor outputs regarding the performance of these components. In one such controller, the CENSE™ system sold by Cummins Engine Company of Columbus, Ind. the data output on bus 14 can include engine speed, engine percent torque, instantaneous engine load, instantaneous fuel rates, as well as data related to the functional elements of the engine such as valve position, fuel injector setting, and the like.

The monitoring device 10 can be mounted within the vehicle, and can include a connector 26 to enable convenient connection with a printer 22. In one embodiment, the device 10 includes a microprocessor or micro-controller 28, a keypad 30, a back light 32 for eliminating an LCD display 34, a DUART asynchronous receiver/transmitter 36 and an audible alarm 38. The majority of the data processed by the micro-controller 28 is received through the communications link 14. However, additional data inputs to the micro-controller can be provided, such as an engine speed signal 40 and a vehicle speed signal 42.

The micro-controller 28 is programmable via the keypad 30 to accumulate and output specific trip data, such as odometer setting and trip mileage, total fuel consumption and mean fuel consumption rate. As a further refinement, the monitoring device 10, and particularly the micro-controller 28, can be programmed to delineate fuel usage and fuel economy as a function of certain specific categories of the vehicle operation. In one mode of operation of the monitoring device 10 shown in FIG. 1, the device generates an audit trail indicative of the overall performance of the vehicle during a particular trip. A sample output of this form is depicted in FIG. 2. In the illustrated embodiment, four such categories can be implemented: drive, in which the vehicle has a non-zero speed; idle, in which the vehicle speed is zero; PTO, in which the vehicle engine is driving an auxiliary component; and a vehicle speed greater than 65 miles per hour (or any other predetermined speed).

The monitoring device 10 provides the information shown in the output of FIG. 2 to allow the vehicle operator/owner to evaluate the vehicle and/or vehicle operator performance. For example, the audit trail shown in FIG. 2 provides information as to the amount of time that the vehicle is running at idle. A lengthy idle period significantly reduces the fuel economy for the vehicle, and is indicative of poor vehicle usage or driving habits of the vehicle operator.

The monitoring device 10 is shown in more detail in U.S. Pat. No. 5,303,163, assigned to Cummins Electronic Company and issued on Apr. 12, 1994, the disclosure of which is incorporated herein by reference. This system presents a significant improvement for a vehicle owner/operator's ability to maximize the usage and profitability of the vehicle. The configurable monitoring system disclosed in that patent provides a clear indication of the overall performance of the vehicle over particular trips. This information can then be used by the owner/operator to establish performance or operating limits that cannot be exceed by the vehicle operator. Hence, the system 10 can include an alarm 38 which can be activated when the vehicle or engine exceeds or falls below limits that are newly established in view of the prior recorded performance of the vehicle and operator. Thus, the invention of the '163 patent provides a secure and configurable monitoring device that helps a vehicle owner optimize the overall usage and performance of the subject vehicle.

However, the monitoring device shown in the '163 patent is focused more on a global level—i.e., the overall performance of the vehicle—as opposed to a local level concentrating on the overall performance of the individual elements of the vehicle, such as the engine. While the device of the '163 patent allows the vehicle owner to establish overall vehicle operating parameters, it does not provide a basis for establishing specific operating parameters for specific vehicle components like the engine.

Consequently, there remains a need for a monitoring system that has the capacity for providing meaningful data throughout the entire operation of a specific vehicle component, such as the engine. This need is further expressed within the overall desire to improve the performance of the components, and ultimately its cost efficiency to the vehicle owner/operator.

SUMMARY OF THE INVENTION

In order to address this need, the present invention contemplates a system and method for monitoring engine performance, and more particularly for defining a duty cycle specific to the particular engine, vehicle and operator. Preferably, the system contemplates a micro-controller that is separate from, but works in conjunction with, an engine/vehicle controller. The engine/vehicle controller provides control signals to various functional components of the engine and vehicle. In addition, the engine/vehicle controller generates data from sensors and virtual sensors indicative of current operating conditions. The micro-controller of the present invention communicates with the engine/vehicle controller to extract data concerning selected operating conditions.

The engine duty cycle can be defined from an engine performance curve that is a function of two or more engine operating parameters or conditions. In a preferred embodiment, engine torque and speed are used to describe the curve. In one feature of the invention, the engine owner/operator can input data into a micro-controller sufficient to define the curve. Preferably, the torque/speed curve is defined by seven data points.

In one aspect of the invention, the area under the performance curve is segmented into a plurality of sectors, each sector corresponding to a range of values for the two or more engine operating parameters. In the preferred embodiment in which torque and speed are the selected operating parameters, the sectors are bounded by engine speeds enveloping the engine speeds input by the user to define the torque/speed curve. The sectors are further bounded by torque values corresponding to specific percent torque curves—, e.g., 100, 90, 70, 50 and 30 percent of rated torque. The invention contemplates that the speed and torque boundaries defining the duty cycle sectors can be established to provide sufficient information to gauge the engine (or vehicle) performance throughout its duty cycle. For instance, a greater concentration of sectors may be preferable in certain regions of the duty cycle to provide more precise information about the engine operation.

During operation of the engine/vehicle, the micro-controller obtains current data indicative of the monitored engine operating parameters (torque and speed in the preferred embodiment). This current data is then compared to the range of values defining the duty cycle sectors to determine a target sector within which the current data falls. A duty cycle parameter is associated with each sector that is different from the two or more engine operating parameters and unique to that sector. When the engine operating conditions fall within a target sector, the duty cycle parameter for that sector is updated by the monitoring micro-controller.

In one embodiment of the invention, the duty cycle parameter is cumulative time spent in each duty cycle sector. Thus, in one aspect, each duty cycle parameter can be represented by a counter or a cumulative timer maintained in memory for a corresponding target sector. The micro-controller then increments the counter for the appropriate target sector based upon the current data received from the engine/vehicle controller.

The monitoring micro-controller continuously reads the current engine performance data and updates the appropriate duty cycle parameter over predefined iterations. In one embodiment, each iteration occurs at a one second interval. A long term duty cycle map can then be defined by repeating these iterations many times to generate data for a predetermined number of hours of engine operation. Preferably, the long term map is based upon 60,000 hours of engine operation, which can correspond to the number of hours between engine rebuilds for an industrial or commercial engine/vehicle application.

The invention further contemplates generating a display of the engine duty cycle map. This display can include numeric entries in display cells corresponding to the defined duty cycle sectors. The numeric entries preferably correspond to the accumulated time that the engine operated within each sector. Alternatively, a color-coding scheme can be applied to each display cell, where certain ranges of values for the duty cycle parameters are associated with certain colors. This display can be generated on an independent computer based on duty cycle data downloaded from the vehicle-based micro-controller using a conventional data tool.

Armed with the duty cycle information, the engine/vehicle owner, operator or technician can make educated judgments concerning the performance of the engine. This information can be used to determine whether changes are needed in the engine control routines implemented by the engine/vehicle controller. For instance, the duty cycle information generated by the present invention can clearly illustrate that the engine is operating at certain torque/speed combinations, allowing the engine fueling protocol to be modified for optimum operation at those combinations.

In a further feature of the invention, the duty cycle parameter can be the amount of fuel consumed by the engine within the corresponding target sector. A counter can be maintained in memory associated with each sector that is increased when the sensed engine operating parameters fall within the target sector. Data for the amount of fuel consumed over each monitoring iteration can be extracted from a sensor and virtual sensor data generated by the engine/vehicle controller. The duty cycle can thus be defined in terms of fuel consumption, in lieu of or in addition to the cumulative time parameter. This information can be processed with an eye toward modifying the engine fueling strategy implemented by the engine/vehicle controller.

It is also contemplated that additional data can be stored related to each duty cycle sector. For instance, various performance values can be calculated from current sensor data at each monitoring iteration. Values such as instantaneous and cumulative load and speed factors can be stored in memory and date stamped on each pass through the monitoring cycle.

The preferred embodiment contemplates a long term duty cycle map that is downloaded and analyzed relatively infrequently. The invention provides for additional shorter term duty cycle maps created over a significantly fewer number of monitoring iterations. In a specific embodiment, a short term duty cycle map is created from the same data as the long term map, but for a limited number of operating hours (typically 8 to 1000 hours). The short term maps can be downloaded more frequently for making quick adjustments to the engine control routines, evaluating engine/vehicle operator performance, or determining short term maintenance requirements. In one specific embodiment, two such short term maps are provided that are sequentially filled during the monitoring iterations.

One object of the present invention is to provide a system and method for generating an accurate profile of the duty cycle for an engine/vehicle combination that can be used to monitor engine performance and serve as a foundation for modifying associated control routines. Another object is accomplished by features of the invention that permit definition of the duty cycle as a function of various parameters, such as elapsed time and fuel consumption.

One benefit of the invention is that it provides accurate duty cycle information tailored to the specific engine/vehicle application. Another benefit is that the duty cycle information generated in certain embodiments of the invention can be readily displayed for interpretation and evaluation by vehicle/engine owners, operators or technicians.

Other objects and benefits of the invention will become apparent upon consideration of the following written description together with the accompanying drawings.

DESCRIPTION OF THE PREFERRED EMBODIMENTS

Figure 1:
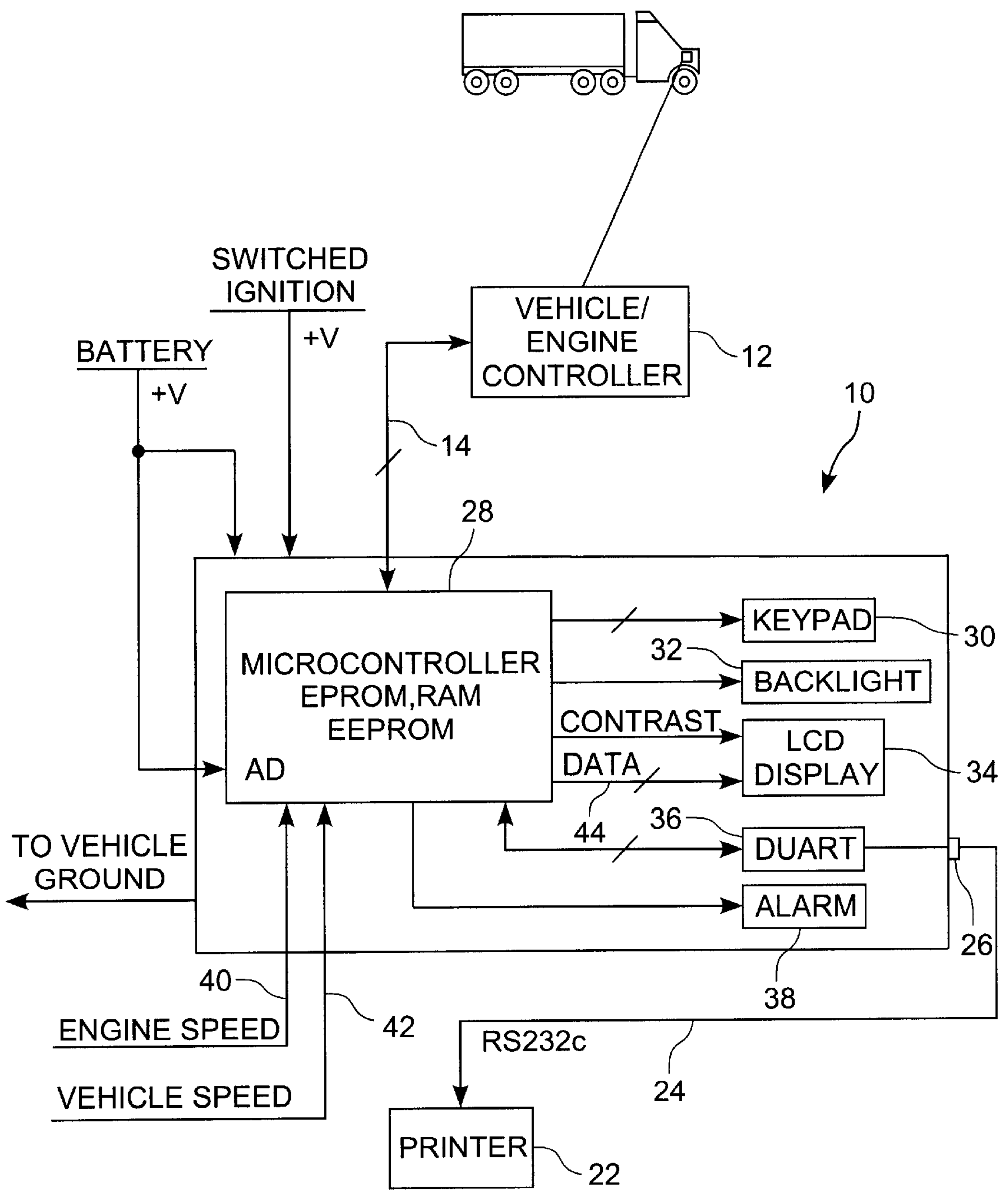
FIG. 1 (PRIOR ART )
FIG. 1 is a block diagram of a vehicle monitoring system according to one embodiment of the invention shown in U.S. Pat. No. 5,303,163.
Figure 2:
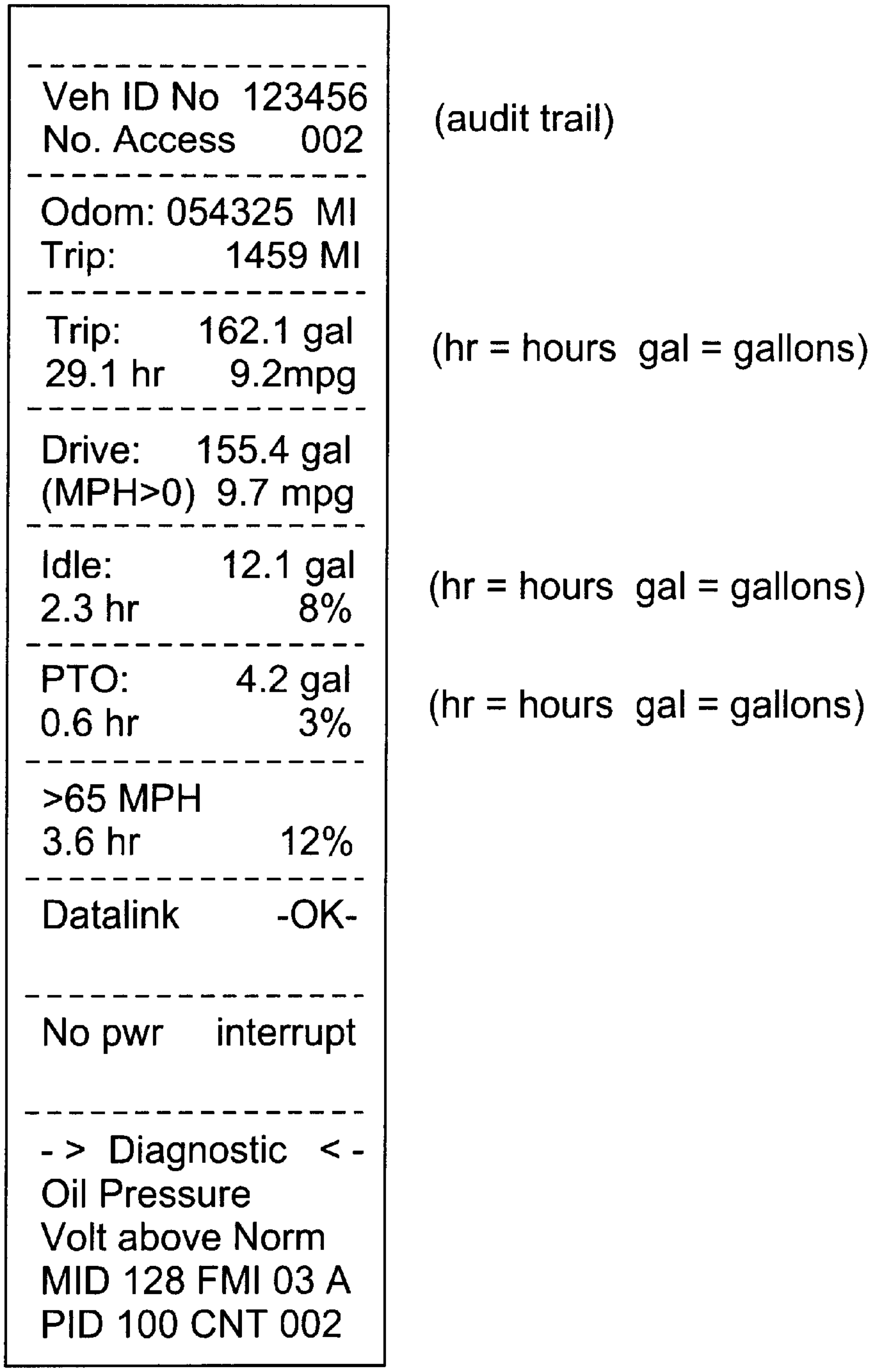
FIG. 2 (PRIOR ART )
FIG. 2 is a sample printout produced by the vehicle monitoring device shown in FIG. 1.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alternations and further modifications in the illustrated devices and described methods and further applications of the principles of the invention which would normally occur to one skilled in the art to which the invention relates.

In accordance with one aspect of the present invention, a system is provided for monitoring the performance of a power plant, most particularly a vehicle engine. In certain features of the invention, the monitoring system ascertains the engine duty cycle over a predetermined sampling period to determine the nature of the work performed by the engine and vehicle. In another feature, the system includes means for evaluating fuel consumption as a function of the duty cycle.

The preferred embodiment of the invention concerns an engine monitoring system for an automotive vehicle, such as a long-haul truck. Of course, other vehicles are contemplated, ranging from heavy-duty off-road vehicles to light-duty on-road passenger vehicles. Moreover, the invention can be applied to power plants or engines outside the automotive realm. One important benefit of the present invention is that it provides a mechanism for adjusting the operational parameters of the affected power plants, whether an automotive or non-automotive engine, or other device, to optimize performance as a function of duty cycle.

Figure 3:
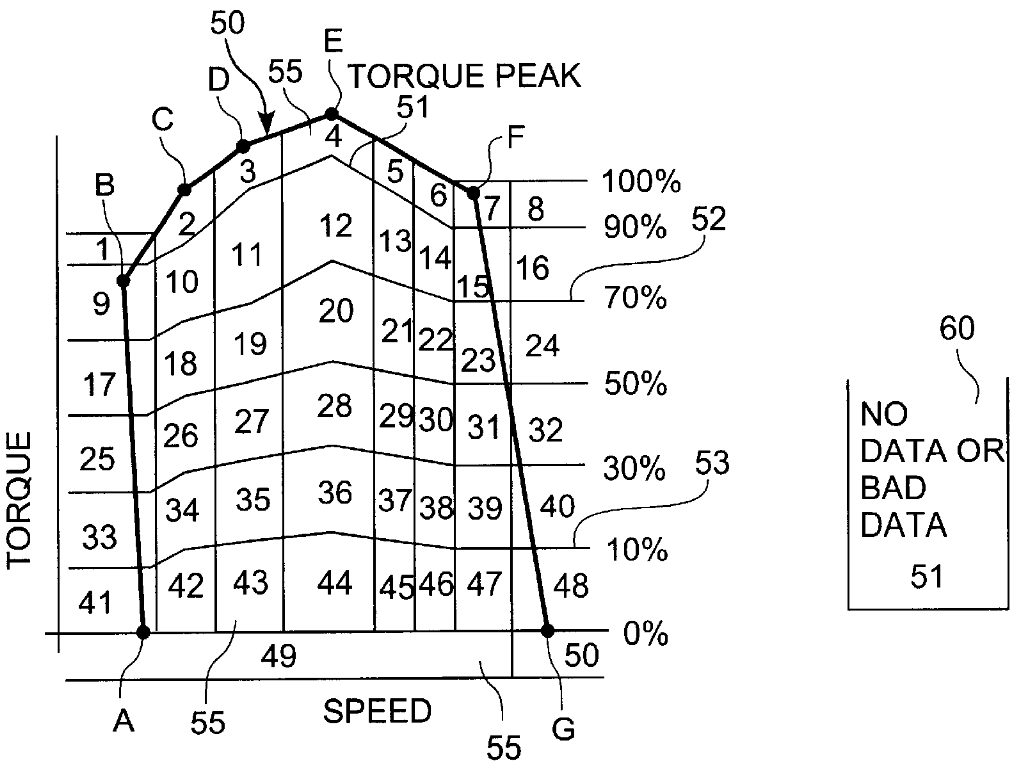
FIG. 3 is a graphical representation of a duty cycle curve for an automotive internal combustion engine.

The operation of many engines can be described and evaluated using a torque-speed graph, such as the graph shown in FIG. 3. Each engine has a characteristic one-hundred percent torque-speed curve, such as curve 50. In accordance with the present invention, the one-hundred percent level is determined as a function of the maximum engine torque for a given engine speed. The torque developed by the engine is a function of the fueling quantity and rate provided to the combustion cylinders. Thus, the torque curve 50 provides a general baseline by which the engine performance can be measured in real-time and evaluated for changes in the engine fueling strategy.

While the torque-speed curve for any particular engine can be represented by a continuous smooth curve, the present invention contemplates defining the curve using a discrete number of speed-torque data points. Thus, as shown in FIG. 3, the curve 50 is defined by seven such data points A–G. In the preferred embodiment, the first data point A is the engine low idle speed. The last data point G is preferably the engine high cutoff speed. The remaining five data points, B–F, define the overall shape of the torque-speed curve. In the illustrated curve, the data point E represents the peak torque value for the particular engine. In other adaptations of the invention, different numbers of data points can be used to define the engine torque-speed curve 50, with consideration given to the amount of computer memory and processing time that the additional data may be required.

By definition, a duty cycle represents the amount of time that the vehicle engine spends at a particular operating condition. In broad terms, an engine duty cycle can be defined simply by the percent of engine running time that is spent at idle and the percent of running time spent in a "running" or non-idle mode of operation. While this type of information is useful in evaluating the overall driving habits of a vehicle operator, it does little to describe the overall engine operating performance. Moreover, this rudimentary approach provides little foundation for adjusting engine operating parameters to improve overall performance and efficiency.

Thus, in accordance with the present invention, the duty cycle is defined in terms of a plurality of "data buckets" contained in a memory, with each bucket corresponding to a predetermined sector of the area underneath the torque-speed curve. Thus, as shown in the specific embodiment in FIG. 3, the torque-speed curve 50 defines several sectors 55, numbered one through fifty. The definition and location of each of the sectors 55 can be modified according to the shape of the particular engine torque-speed curve. It is understood that the greater number of sectors available provides a more detailed map of the duty cycle for a particular engine-vehicle combination. On the other hand, the larger the number of sectors means a much larger number of data buckets contained in the memory of the monitoring device.

In the specific embodiment illustrated in FIG. 3, the data sectors 55 are defined first in terms of a percentage of the engine rated torque at each engine speed. Thus, while the torque-speed curve 50 represents the one-hundred percent rated torque line, curve 51 represents the ninety percent line, curve 52 the seventy percent line, and curve 53 the ten percent line, for example. In addition, each sector is defined by a minimum and maximum engine speed. In accordance with the illustrated embodiment, the sector delimiting speeds are situated halfway between the torque data points B–G.

In the illustrated embodiment, forty-eight sectors are defined based upon the torque-speed curve. An additional sector number forty-nine is maintained in memory to correspond to engine operating speeds less than the engine high cutoff rpm (data point G). A further sector number fifty corresponds to engine speeds greater than the high-speed cutoff rpm.

In accordance with the present invention, the engine operation is evaluated over a predetermined number of iterations, with each iteration occurring at a predetermined time interval. As explained in more detail herein, engine performance data is extracted at each iteration and data is loaded into the sector data buckets. In some instances, no performance information is obtained, or the information is corrupt. A final sector 60, numbered fifty-one in the example, provides a storage location for monitoring intervals in which no data or bad data is produced.

The present invention resides in a modification to an engine monitoring device, such as device 10 shown in FIG. 1. More particularly, the present invention can be implemented by software instructions executed by the microcontroller 28, and by memory storage locations within the device 10. Thus, each of the sectors or data bucket numbers one to fifty-one corresponds to a particular range of memory locations. In one approach, each data sector can be allotted a predefined series of memory addresses, whether contiguous or noncontiguous. Alternatively, the size of the blocks of memory for each data sector can vary, although the total amount of available memory is limited. With this latter approach, sufficient memory space can be allocated among all of the fifty-one sectors to store data for approximately 60,000 hours of engine operation recorded at one-second intervals.

Of course, the total amount of memory is affected by the overall duration of the duty cycle monitoring sequence, the monitoring time intervals, and the amount of data stored at each monitoring iteration. In accordance with the specific preferred embodiment, the micro-controller, such as controller 28, can include a RAM or other long-term resident memory to store all of the duty cycle information. As a further alternative, the data can be stored onto an external media, such as a floppy disk or CD ROM.

Figure 4:
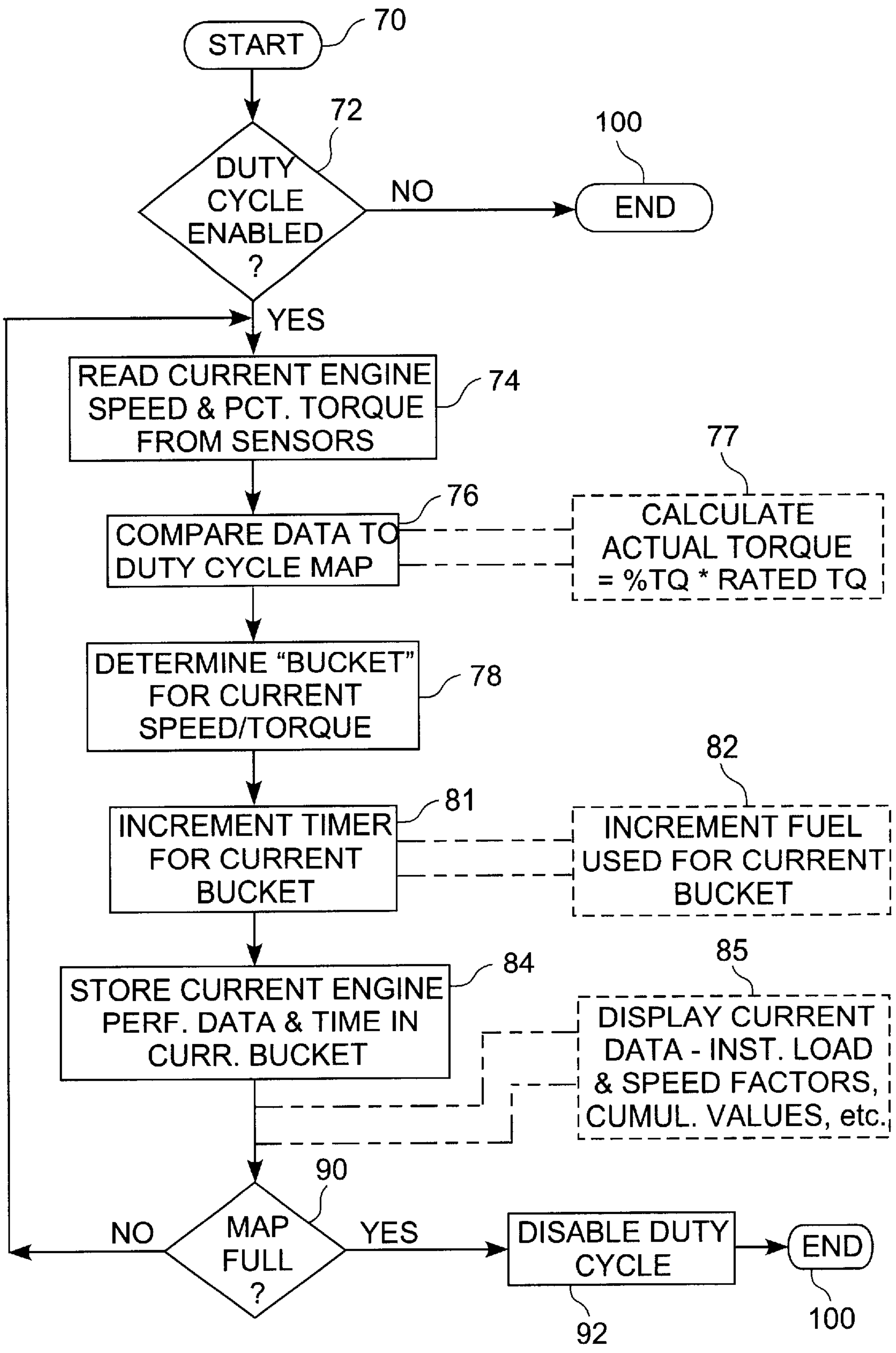
FIG. 4 is a flowchart of steps executed by a program implemented by an engine monitoring system according to one embodiment of the present invention.

Referring now to FIG. 4, the steps according to a preferred method of the present invention are disclosed. It is understood that these steps are preferably implemented as software instructions stored within and executed by a micro-controller, such as micro-controller 28 of the system 10 in FIG. 1 modified as set forth above. The initial step 70 can be commenced at a predetermined time. Preferably, the duty cycle monitoring function is initiated after an engine overhaul or rebuild. Alternatively, the duty cycle monitoring routine can be initiated when the vehicle is started, or when the vehicle transmission is placed in drive or reverse. Preferably, the routine operates in the background relative to other monitoring programs executed by the micro-controller.

In the next step 72, it is determined whether the duty cycle monitoring feature has been specifically enabled by the vehicle operator. It is contemplated that the keypad 30 can provide an interface to the micro-controller 28 by which the vehicle owner or operator can enable or disable the duty cycle monitoring feature. In some instances, it may not be desirable to collect the duty cycle data, such as cases where the trip duration is not long enough or where the travel environment is atypical. In the event that the duty cycle monitoring feature is not enabled, the routine passes to an end step 100 at which control flows to other background routines.

However, if the duty cycle monitoring feature has been requested, control passes to step 74. In general terms, step 74 reads sensor data that is provided on the data bus 14 between the vehicle/engine controller 12 and the monitoring device 10. It is understood that in the context of the present invention, the term sensor is loosely defined to include not only signals from physical sensors, but also data generated by "virtual sensors" operating within the engine vehicle/engine controller 12. For example, engine speed can be provided by an actual sensor, while percent torque data is generated by a virtual sensor using data received from actual sensors.

In the specific embodiment, the torque-speed curve of FIG. 3 is used to define the duty cycle environment. Thus, step 74 entails reading the current engine speed and percent torque data from the appropriate sensor data lines on the bus 14. The current engine speed value can also be obtained from the separate input signal 40 provided directly to the micro-controller 28, as depicted in FIG. 1. The percent torque value is a value generated automatically by the vehicle/engine controller because that information is used in a variety of other control routines implemented by the unit 12.

In the illustrated embodiment, once the sensor data has been obtained, it is compared with the duty cycle map in step 76. More specifically, the data is evaluated with respect to each of the plurality of sectors 55, numbered one through fifty-one, defined within the torque curve shown in FIG. 3. The current torque and speed data is evaluated to determine whether the data falls within the torque and speed ranges of each sector.

Depending on the nature of the data received from the engine controller, an additional step 77 may be required to derive an actual torque value for use in the comparison step 76. For instance, where the data received from the engine controller is in terms of percent torque, a conversion to an actual torque value is preferable to comply with the units of the torque-speed curve. The duty cycle map as shown in FIG. 3 relies upon engine speed in rpm and actual torque in foot pounds or similar units. In some instances, the duty cycle map can be generated using percent of rated torque, as described above. In other instances, an actual torque value is necessary to determine the appropriate sector within which the data falls in the duty cycle map of FIG. 3.

Once the current relevant operating parameters (i.e., torque and speed) have been ascertained, a determination is made in step 77 as to which sector numbered one to fifty-one the current data falls. For instance, for an engine speed halfway between the low idle speed point A and high speed cutoff point G, and a percent rated torque value of sixty percent, the current speed and torque places the current engine operating condition in a target sector number twenty. It is understood that every iteration or pass through the program loop of FIG. 4 can yield a different current engine speed and percent torque sensor value, which is then applied to a different target sector within the duty cycle map shown in FIG. 3. A variety of approaches can be taken to match the current data to the proper target sector. For instance, the current torque/speed data pair can be compared to the torque and speed boundary values for each sector. In another approach, one of the current data values, such as speed, can be used to identify a column of sectors to evaluate, followed by a comparison of the current torque data to the torque limits of the identified column to find the target sector.

In accordance with the present embodiment, the engine duty cycle is reflected by the amount of time that the engine operates with torque and speed combinations with particular sector numbers one to fifty-one. Once the particular target sector has been identified, the amount of engine operating time spent within that sector is increased to reflect the current engine performance data. In one embodiment, this feature is accomplished in step 81 in which a counter or timer particular to each sector is incremented in view of the determination made in step 78. For example, in the specific illustrated embodiment in which the speed and torque values fall within sector number twenty, a cumulative timer associated with that target sector is incremented by the sample time for each iteration. In the most preferred embodiment, that sample time is one second, although other time increments are contemplated. For each sample time that the engine spends within that sector, the timer is incremented. For any time that the engine spends in another sector, the timer associated with that sector is incremented.

For iterations in which no data is obtained or the data is determined to be bad (i.e., outside predetermined limits), sector 60, numbered fifty-one, is incremented. Thus, in the preferred embodiment illustrated in FIG. 3, the total duty cycle monitoring time should equal the sum of the timer values for the sectors one through forty-eight and fifty-one.

In a further aspect, sector numbers forty-nine and fifty are separately incremented, depending upon whether the engine speed is above or below the engine high-speed cutoff rpm. In this instance, the total duty cycle monitoring time over the predetermined number of iterations should equal the sum of the times for the timers of sectors forty-nine and fifty.

Once a determination has been as to the target sector corresponding to the current engine speed and torque, additional data can be stored within the current sector location in step 84. This additional data can encompass a wide range of information as necessary to evaluate the performance of the engine over the particular duty cycle. For example, the time of day and/or date can be stored in step 84. In addition, other calculated data can be included, such as instantaneous load factor and instantaneous speed factor. The instantaneous load factor can be calculated from the ratio of the current torque value, obtained in step 74, relative to the engine full load torque at the current engine speed. The speed factor is the ratio of the current engine speed relative to the engine high cutoff r.p.m. Other information can include the average load factor and average speed factor thus far into the development of the duty cycle map. These average values can be obtained by summing the calculated load and speed factors over all of the sector entries and the dividing by the total number of sector entries, which number corresponds to the number of iterations through the duty cycle calculation routine.

After all of the pertinent information has been stored in the appropriate sector location, program control passes to conditional step 90 to determine whether the duty cycle map is full. In the preferred embodiment, the map formed by each of the sectors 55 (see FIG. 3) accepts a limited amount of data, in consideration of memory limitations. In the specific embodiment, the data buckets within the micro-controller memory can contain data for 60,000 hours of engine operation. Once that limit is reached, the map is determined to be full. Otherwise, control passes back to step 74 at the appropriate sampling time increment. If the map is determined to full, the duty cycle routine is disabled in step 92 and the sequence preferably ends at step 100.

In accordance with a further aspect of the present invention, the inventive system also includes features operable to allocate the quantity of fuel used based upon the engine duty cycle. Thus, in a further embodiment, each sector can maintain a counter for keeping track of the total fuel used while the engine is operating at the particular torque and speed for the target sector. Thus, the routine can include an additional step in conjunction with step 81. In this step 82, a fuel-used value or counter is incremented for the particular sector. In this way, each sector not only maintains an up-to-date measure of the amount of time spend in the particular sector of the duty cycle, it also maintains a continuous measure of the amount of fuel used in that region. This information can be used to refine or tailor the engine control routines that direct the operation of the engine. For example, if it is known that a greater amount of time and fuel is spent in a particular region of the duty cycle, modifications can be made to the engine fueling protocol, such as the air-fuel mixture and timing, when the particular torque-speed combination is sensed by the onboard engine sensors.

In a further modification of the routine depicted in FIG. 4, a step 85 can be incorporated immediately following step 84 where current engine performance data is stored. In this step 85, the current data can be displayed, such as on the LCD display 34 of the system 10 shown in FIG. 1. This display can then give the vehicle operator an immediate indication of the engine's performance over its duty cycle. Moreover, in a typical case, the vehicle and engine will follow a relatively consistent duty cycle. The display of the current data can allow the vehicle operator to determine whether the vehicle is being operated outside the normal duty cycle, and then make appropriate corrections in the vehicle operation.

Figure 5:
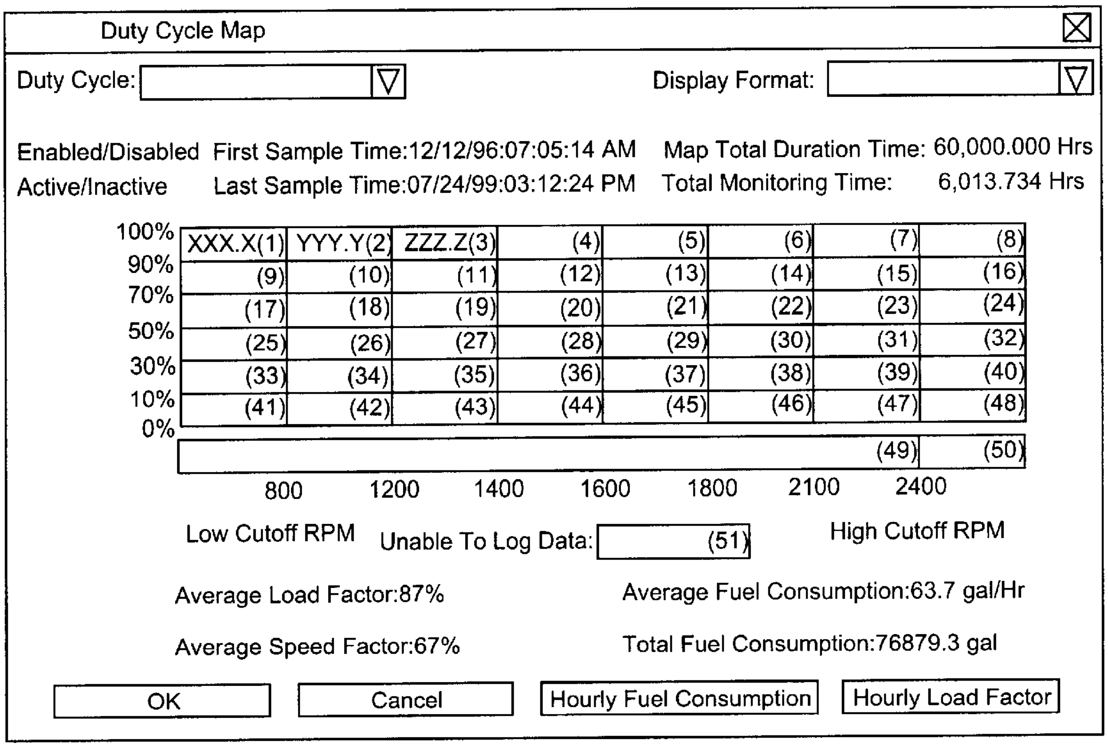
FIG. 5 is a sample output display produced by an engine monitoring system according to one embodiment of the present invention.
Figure 6:
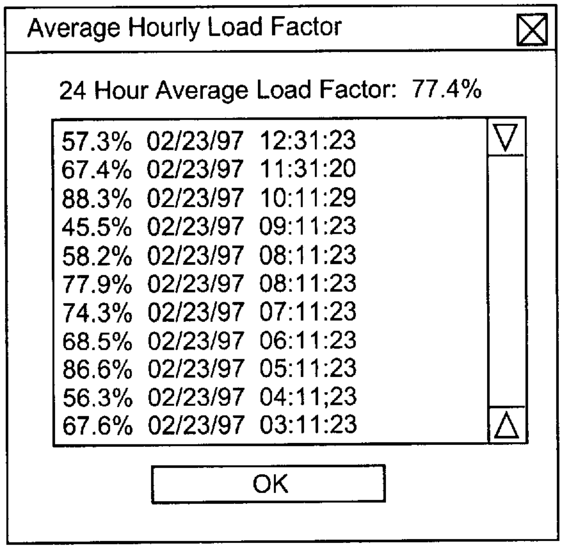
FIG. 6 is a second output display generated in accordance with the present invention.
Figure 7:
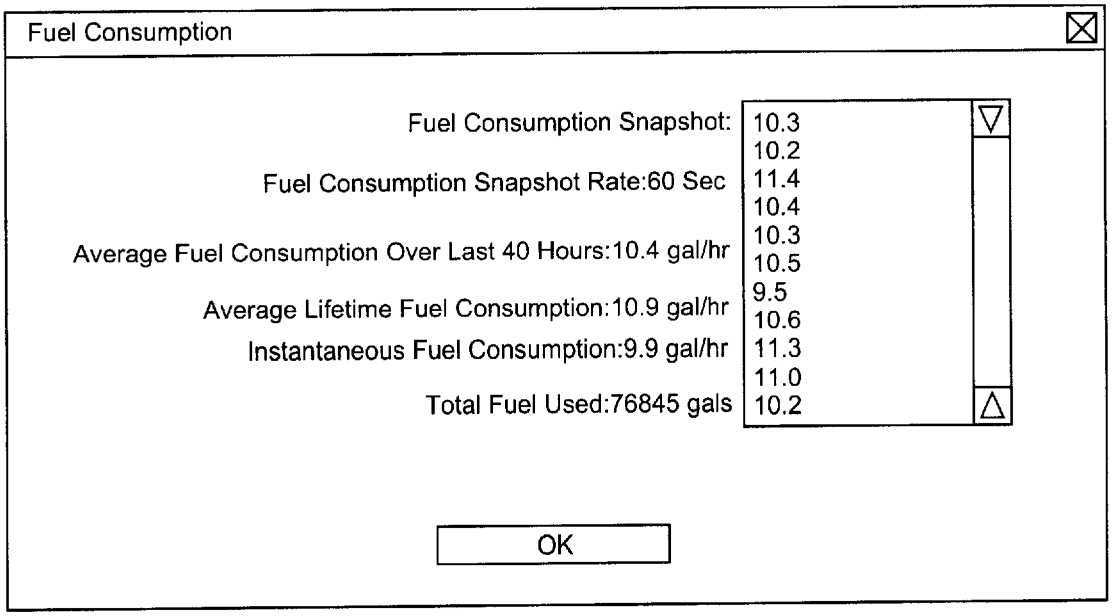
FIG. 7 is a third output display generated in accordance with one embodiment of the present invention.

Referring now to FIGS. 5–7, certain output displays are depicted that can be generated by the system according to the present invention. More specifically, once the duty cycle map is full and the routine is stopped at the step 100, a further display routine can be activated. Preferably, this data display occurs on a separate computer. In this instance, information can be extracted from the modified micro-controller through a diagnostic tool or the like. The DUART 36 of the device 10 can provide the means for communicating or downloading the data contained within the memory data buckets corresponding to each of the duty cycle sector numbers one through fifty-one. This data can then be analyzed independent of the operation of the vehicle.

A first display is shown in FIG. 5 in which the actual engine duty cycle is depicted. More specifically, a number of display cells, corresponding to each of the fifty-one duty cycle sectors, are illustrated. The boundary between each column of display cells represents specific engine speeds. The boundaries between horizontal rows of display cells represent the percent torque values as indicated in the graph of FIG. 3. It is understood that the torque and speed limit values defining the several duty cycle sectors can be established in a variety of ways. For instance, the torque limit values can be set at percentages different from the 100, 90, 70, 50, 30 and 10 percent values shown in the illustrated embodiment.

Moreover, the torque and speed values can be tailored to provide more detailed definition of the engine duty cycle for certain operating ranges. For example, if a particular engine and vehicle application spends a great amount of operating time in a high torque and moderate speed range, a greater number of duty cycle sectors and display cells can be defined in that particular region.

In a preferred embodiment, each display cell includes a decimal number, such as XXX.X, YYY.Y or ZZZ.Z, indicative of the actual amount of time accumulated in each of the duty cycle sectors. Thus, the display cells identified by the parenthetic numbers one through forty-eight in FIG. 5, are indicative of the actual engine duty cycle performance. The two cells immediately below the forty-eight contiguous cells, namely cell numbers forty-nine and fifty, represent the amount of time spent below and above the engine high cutoff speed. Finally, display cell number fifty-one represents the amount of time wherein the available data was inadequate or inaccurate.

The display shown in FIG. 5 can include a variety of additional pertinent information, such as the calendar date and clock time that the duty cycle map monitoring function commenced and ended, as well as the total duration time. In addition, at the bottom of the screen various specific calculated information is displayed, such as average load and speed factor over the entire duty cycle.

Two additional bits of calculated information are the average fuel consumption and the total fuel consumption throughout the duty cycle shown in the display. These calculations can be obtained according to the optional step 82 of the flowchart shown in FIG. 4. In addition to displaying the amount of time spent in each of the duty cycle sectors, the display cells could also display fuel consumption within each duty cycle sector.

In the preferred embodiment, each of the display cells is envisioned to contain a number indicative of either total duty cycle time or total fuel consumption within the corresponding duty cycle sector. Alternatively, other visual indicia can be displayed in each cell. In an alternative embodiment, a particular color, which is indicative of a specific range of time or fuel consumption, can be displayed in a cell. For instance, duty cycle sectors for which the total time spent in the target sector exceeded 1,000 hours could be red, while times in the range of 800–1,000 hours could be orange. Other colors can be applied to specific duty cycle times and/or fuel usage ranges. In this way, the duty cycle display of FIG. 5 can present an immediate visual characterization of the engine duty cycle.

An additional display can be as depicted in FIG. 6. In this figure, the average load factor at generally hourly increments can be displayed. In the specific embodiment, the display shows load factor over selected 24 hour periods. Information of this type can be particularly useful for evaluating the performance of off-road or construction vehicles.

An additional display, as shown in FIG. 7, is more specifically directed to the fuel consumption monitoring feature of the present invention. In this display, the actual engine fuel consumption is displayed independent of the engine duty cycle. Display snapshots can be taken of the fuel consumption rate and displayed subsequently in a scroll bar display. In addition, an average consumption over a predetermined time period and over the engine lifetime can be output.

As should be clear from the foregoing, the present invention provides essentially interactive data concerning the actual performance of the vehicle and engine. One important feature of the invention is that it provides a capability to measure the amount of time spent and fuel consumed by the engine while operating in specific regions within the torque-speed curve. The invention contemplates that other engine operating parameters can be used to define the engine duty cycle. In that instance, current data from sensors indicative of the subject engine operating parameters is obtained and evaluated to define the engine duty cycle.

The present invention develops a duty cycle map that is specific to each engine/vehicle combination. Moreover, the invention generates a duty cycle map that is also specific to the particular vehicle operator. This system can then provide insight not only to the way that the engine performs, but also into the way that the vehicle operator utilizes the engine, possibly exposing bad driving or operation habits.

In order to enhance the flexibility of this system, a number of different duty cycle maps can be provided. In the illustrated embodiment, the map provides a long term indication of the engine duty cycle. This long term map can be calibrated to the frequency of engine rebuilds. In a typical industrial or commercial internal combustion engine, the rebuilds occur every 60,000 hours of engine operation, regardless of the number of miles traveled. Thus, at every rebuild, the duty cycle information can be downloaded and evaluated to determine whether certain changes need to be made in the engine control routines.

Alternatively, in conjunction with the long term duty cycle map, additional short term maps can be maintained within the micro-controller. Thus, separate blocks of memory can be set aside for one or more short term duty cycle maps. In this instance, the same information can be stored in all of the different maps that may be maintained. The short term duty cycle map can be particularly useful in the evaluation of periodic engine maintenance requirements. For instance, the short term map can be reviewed to determine engine oil life. It is known that oil viscosity is more adversely impacted under certain operating conditions, or when the engine is operating within certain sectors of the duty cycle map. If evaluation of the short term map reveals extended operation in those specific sectors, an oil change may be warranted. On the other hand, if the duty cycle map reveals that the engine had been operated predominately in sectors that have a lesser impact on engine life, the oil change can be delayed.

In one specific embodiment, one long term and two short term duty cycle maps are provided. Data is continually stored into the long term map over the specified total time duration. The short term maps can be filled sequentially. In other words, data can be entered into one map at a time. Once a particular short term map has been filled, data is then delivered to the sectors of the next short term map. This approach takes into account circumstances where the vehicle may not be immediately available for download and analysis of the short term duty cycle information. An indicator can be provided once one short term map is full to suggest a maintenance stop for the vehicle. The total time duration for the short term duty cycle maps can vary widely. In a specific embodiment, the duration can be adjusted from 8 hours to 1,000 hours of data.

As indicated above, the present invention can be implemented as a modification to the micro-controller 28 shown in FIG. 10. As with that micro-controller and its operation as described in U.S. Pat. No. 5,303,163, which disclosure is incorporated herein by reference, the mode of operation of the micro-controller can be varied by external input. More specifically, a service tool can communicate with the micro-controller through the DUART 36. For the illustrated embodiment, the external tool can be used to input the torque data points represented by points A–G of the torque curve shown in FIG. 3. For this embodiment, the first and last points A and G correspond to the low cut off r.p.m. and the high cutoff r.p.m. The highest torque value entered for the curve can correspond to the rated torque for the engine which is subsequently used to determined the actual current torque, such as in step 74 of the flow chart of in FIG. 4. The engine rated speed can be separately input.

The external tool can also be used to turn the duty cycle motoring features off or on, enable or disable the short term duty cycle feature, and establish the short term duty cycle duration. Similarly, the tool can enable or disable the fuel consumption motoring feature of the invention.

Once the duty cycle and fuel consumption software features have been properly calibrated, the routine then only needs to monitor sensor data provided directly from the vehicle/engine controller, such as controller 12. In the preferred embodiment, these inputs include current engine speed, current percent output torque and an instantaneous fuel consumption rate. All of these values are typically already being calculated by the engine control module as part of its engine control function.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A method for monitoring engine performance comprising the steps of:

defining an engine performance curve as a function of two or more engine operating parameters;

defining in memory a plurality of sectors bounded by the performance curve, each sector corresponding to a range of values for the two or more engine operating parameters;

during operation of the engine, sensing current data indicative of the two or more engine operating parameters;

comparing the current data to each of the ranges of values for the two or more engine operating parameters to determine a target sector, the target sector corresponding to one of the plurality of sectors that includes the current data;

updating in said memory a duty cycle parameter different from the two or more engine operating parameters unique to the target sector; and repeating the sensing, comparing and updating steps for a predetermined number of iterations to generate a duty cycle map for the engine, the duty cycle map indicative of cumulative engine operating time spent in each of said plurality of sectors.

2. The method for monitoring engine performance according to claim 1, wherein the duty cycle parameter is the amount of time that the current data for each iteration falls within the corresponding target sector.

3. The method for monitoring engine performance according to claim 2, wherein each iteration occurs over a predetermined time interval, and the step of updating the duty cycle parameter includes incrementing the amount of time by the predetermined time interval.

4. The method for monitoring engine performance according to claim 1, wherein the duty cycle parameter is the amount of fuel consumed by the engine when the current data for each iteration falls within the corresponding target sector.

5. The method for monitoring engine performance according to claim 4, including the step of storing the current amount of fuel consumed and a time and/or date stamp associated therewith.

6. The method for monitoring engine performance according to claim 1, wherein the two or more engine operating parameters includes actual engine speed and actual engine torque.

7. The method for monitoring engine performance according to claim 1, in which the engine includes an engine control module, wherein:

the steps of comparing the current data and updating a duty cycle parameter occur in a monitoring module independent of the engine control module; and the step of sensing includes receiving the current data from the engine control module.

8. The method for monitoring engine performance according to claim 1, further comprising the steps of:

obtaining current engine performance data; and when updating the duty cycle parameter, storing the current engine performance data in a memory associated with the target sector.

9. The method for monitoring engine performance according to claim 8, further comprising the steps of:

calculating additional engine performance information using the current engine performance data; and storing the additional engine performance information in a memory.

10. The method for monitoring engine performance according to claim 9, including the step of storing a time and/or date stamp with the additional engine performance information.

11. The method for monitoring engine performance according to claim 9, wherein the additional engine performance information includes the engine load factor.

12. The method for monitoring engine performance according to claim 11, comprising the additional step of calculating an engine load factor corresponding to each sector of the duty cycle map.

13. The method for monitoring engine performance according to claim 11, including the step of storing a time and/or date stamp with the additional engine performance information.

14. The method for monitoring engine performance according to claim 1, further comprising the step of displaying a visual representation of the duty cycle map after the predetermined number of iterations.

15. The method for monitoring engine performance according to claim 1, wherein the step of updating a duty cycle parameter includes concurrently updating the parameter for the predetermined number of iterations to generate a long-term duty cycle map and updating the parameter for a significantly fewer predetermined number of iterations to generate a short-term duty cycle map.

16. A system for monitoring performance of an engine controlled by an engine control module, the engine control module operable to generate a plurality of sensor signals indicative of current performance of the engine, the system comprising:

a monitoring device;

a data link between said monitoring device and the engine control module to convey a plurality of sensor signals therebetween;

a memory associated with said monitoring device;

a micro-controller associated with said monitoring device and operable to;

define an engine performance curve as a function of two or more engine operating parameters;

define in said memory a plurality of sectors bounded by said performance curve, each sector corresponding to a range of values for said two or more engine operating parameters;

over a predetermined number of iterations, read current values of selected ones of said plurality of sensor signals indicative of said two or more engine operating parameters;

at each of said predetermined number of iterations, compare said current values to said range of values to determine a target sector of said plurality of sectors that said current data falls within; and at each of said predetermined number of iterations, update a duty cycle parameter stored in a location within said memory unique to said target sector, said duty cycle parameter different from said two or more engine operating parameters, whereby said duty cycle parameter for each of said plurality of sectors defines a duty cycle map for the engine, the duty cycle map indicative of cumulative engine operating time spent in each of said plurality of sectors.

17. The system for monitoring the performance of an engine according to claim 16, wherein said two or more engine operating parameters includes current engine torque and current engine speed.

18. The system for monitoring the performance of an engine according to claim 16, wherein said duty cycle parameter is the amount of time that said current data for each of said iterations falls within said target sector.

19. The system for monitoring the performance of an engine according to claim 16, wherein said duty cycle parameter is the amount of fuel consumed by the engine when said current data for each of said iterations falls within said target sector.

* * * * *